April 9, 1935.  M. OLLEY  1,996,827

CHASSIS AND BODY CONSTRUCTION

Filed Dec. 4, 1933

Inventor
Maurice Olley
By Blackmore, Spencer & Flint
Attorney

Patented Apr. 9, 1935

1,996,827

UNITED STATES PATENT OFFICE 1,996,827

CHASSIS AND BODY CONSTRUCTION

Maurice Olley, Detroit, Mich., assignor to General Motors Corporation, Detroit, Mich., a corporation of Delaware Application December 4, 1933, Serial No. 700,867

7 Claims. (Cl. 180—73)

This invention relates to motor vehicles in which the road wheels are mounted at the ends of longitudinally disposed lever arms pivotally connected to the vehicle frame.

The invention is concerned specifically with a vehicle having a suspension system of the foregoing type applied to the rear wheels with lever arms independently pivoted on the frame forward of the wheels for oscillation of the wheels in a vertical plane parallel with the longitudinal axis of the vehicle about an axis at right angles thereto, having resilient means between the lever arm and the frame acting on the latter at a point rearward of the pivot point so that the reaction of the resilient means on the frame will be in a generally upward direction.

It relates to the construction of a suitable frame for such a vehicle, to the manner of mounting means resiliently restraining movement of the lever arms relatively to the frame, and to the manner of mounting the body on the frame in such a way that its mass may be effective in opposing the reaction of the resilient means on the frame whereby the bending moments to which the latter is subjected will be materially reduced.

As ordinarily constructed, the frames of vehicles provided with the foregoing form of independent suspension of the road wheels are subjected to large bending moments.

One object of the invention is to reduce the vertical load on the pivots and the stresses to which the frame is subjected by providing the rear wheel supporting lever arms with resilient means restraining their movement relative to the frame and so arranged as to exert an upward load on the frame which will be directly opposed by the main downward load of the body through suitably disposed supporting points for the body on the frame.

It is another object of the invention to provide the vehicle with a frame which extends rearward of the pivot points of the wheel supporting lever arms of the rear wheels only far enough to provide a suitable reaction point for the resilient means restraining movement of the wheel supporting lever arms and then to extend the body to the rear thereof, in the form of a bustle to carry as many of the essential masses of the vehicle such as the gasoline tank, spare wheels, and luggage as are necessary to provide the requisite downward load. Such a concentration of masses to the rear is of further advantage in that it increases the polar moment of the car.

It is a further object of the invention to support the rear bumper on the bustle and to provide means for transmitting any blow on the rear bumper to the frame as directly as possible so that the force thereof is divided between the body and the frame.

The general object of the invention is to secure the foregoing specific objects of the invention with such a coordination and organization of the elements involved, which include the frame, the suspension system, the body and the essential loads to be carried thereby, as to secure a low stressed, narrow rigid frame, and an economy of structure in which the essential items such as gasoline tank, spare tires, and luggage constituting non-operative load are carried in a bustle constituting a rearward extension of the body beyond the frame, and unrestricted by the frame, whereby such loads best contribute to the ideal disposition of the masses constituting the load borne by the vehicle, and enable the various loads and forces to which the vehicle is subjected to be advantageously shared between the body and the chassis with an actual reduction of the bending moments on the frame.

The above and other objects of the invention will be apparent as the description proceeds.

The accompanying drawing shows the rear end of a motor vehicle in which the requirements of the suspension necessitate a frame which is narrower than usual but stronger and more rigid. The longitudinal side members of the frame are deep and straight without any sweeps, and are cut off directly behind the differential to form a chassis with a "transom stern" having lateral outriggers which support the body at their ends directly above the shackles of the reversed quarter elliptic rear springs. Not only is there no need for the frame to extend further rearward from this point, but such a rearward extension would actually interfere with the placing of the gasoline tank etc., in the otherwise large unrestricted space which is so well provided by the bustle, without exceeding the rear overhang from wheel center to bumper of an average car.

The concentration of "body" load on the ends of the lateral outriggers of the transom stern provides a downward force directly opposing the concentrated upward force of the springs at that point, thereby reducing very considerably the vertical load on the pivots and the extreme bending moment to which the rear end of the frame would otherwise be subjected at the pivotal point of the lever arms.

In the drawing

Figure 1:
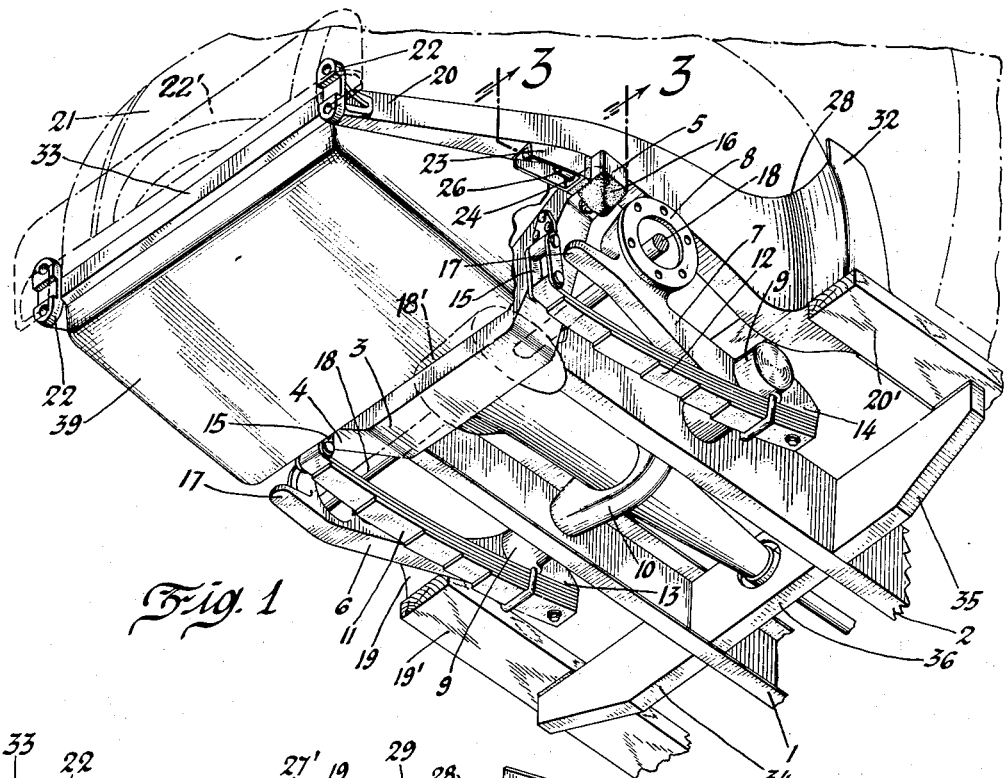
Figure 1 is a perspective view of the underside of the rear end of the chassis.
Figure 2:
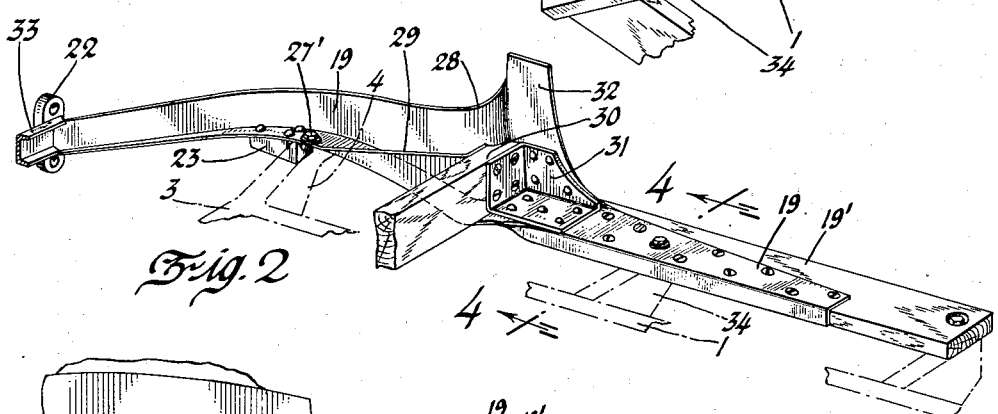
Figure 2 is an enlarged perspective view showing the construction of an extension to the body sill to carry the overhung bustle, and the manner of mounting on the outriggers of the frame.
Figures 3, 4:
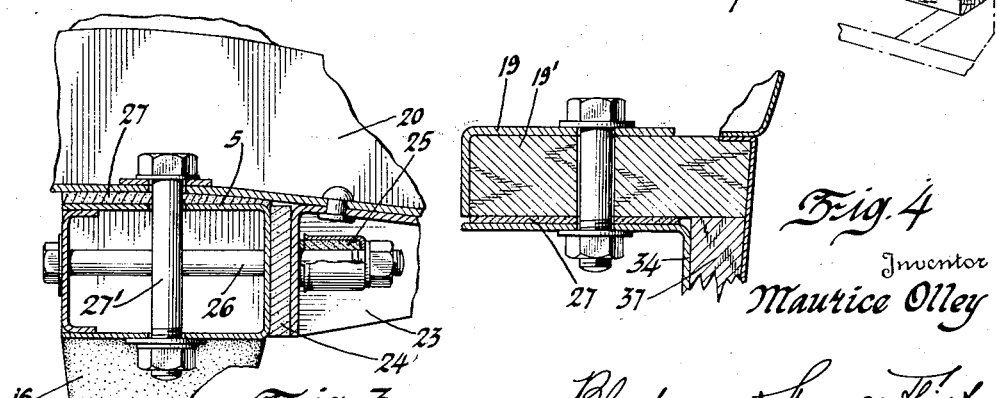
Figure 3 is a part section on line 3—3 of Figure 1 showing the manner in which the extension to the body sill is connected to the rear "transom" outriggers and the manner in which any blow on the rear bumper is transmitted to the frame through the outriggers as directly as possible.
Figure 4 is an enlarged section on line 4—4 of Figure 2 showing the manner of attaching the body sill to outriggers of the frame.

The frame has longitudinal side members 1 and 2 terminating at the rear in a "transom stern" constituted by the rear cross member 3 having outriggers 4 and 5.

Each of the wheel supporting lever arms 6 and 7 is provided with a hollow hub 8 in each of which a road wheel (not shown) is mounted.

Each lever arm is provided also with a hub 9 through which it pivots on a transverse trunnion 10 suitably supported in the frame side members.

Reversed quarter elliptic leaf springs 11 and 12 are respectively rigidly bolted to spring perches 13 and 14 on the hubs 9 of lever arms 6 and 7, and are shackled to the outriggers 4 and 5 through shackles 15.

The springs 11 and 12 are parallel with the longitudinal axis of the vehicle while the lever arms diverge outwards thereto from the pivot hubs 9 in order that the springs will not interfere with the required range of pivotal movement of the lever arms.

A rubber cushion 16 is provided on the underside of the outer end of each outrigger 4 and 5 coacting with a lug extension 17 of each lever arm to cushion the extreme upward movement of the lever arms relatively to the frame.

The differential housing 18' is fixed to the frame and the drive therefrom is taken to the road wheels through universally jointed drive shafts 18.

The body structure includes steel angle plates 19 and 20 which form an extension of the body sills 19' and 20' to carry the overhung bustle 21. These steel angle plates 19 and 20 are provided with brackets 22 for the rear bumper 22'.

Small brackets 23 are mounted on the underside of the angle plates 19 and 20 and serve to transmit any blow on the rear bumper as directly as possible to the outriggers 4 and 5 through the rubber cushions 24 and 25 through which each bracket 23 is connected with its outrigger 4 or 5 by a bolt 26.

Suitable pads 27 of non-resonant material are interposed between the steel angle plates and the outriggers 4 and 5 to which they are attached by a bolt 27'.

In order to strengthen the steel angle plates at the bent portion 28 which is necessary to follow the curve of the rear wheel housing, a plate 29 is welded to each steel angle plate to bear on a stout rear seat heel bar 30 which itself is secured to the angle plates through the plate stiffeners 31.

The extension 32 of each angle plate 19 and 20 forms a support for the rear door pillars (not shown).

The angle plates are extended forward and screwed to the sills 19' and 20' to make a solid structure.

The outer ends of the angle plates 19 and 20 are connected together by a bar 33.

Additional outriggers such as 34, 35 are fastened to the chassis at places where substantial cross members such as 36 can be provided in the frame and the sills 19' and 20' and vertical webs or valances such as 37 which connect the running boards (not shown) to the sills are bolted to the outer ends of the outriggers. Suitable pads such as 27 of non-resonant material are interposed between all the points of connection of the body to the frame.

The bustle 21 and pan 39 form a large box at the rear of the car for housing the gasoline tank, spare wheels, and luggage.

I claim:

1. In a motor vehicle in combination, a narrow frame, lateral outriggers thereon, lever arm supports for the road wheels arranged for pivotal movement about a fixed transverse axis on the frame, a body extending rearwardly beyond the frame including body sills rearwardly overhanging the frame, a rear cross member for the frame, lateral outriggers on the rear cross member, the body being supported on the ends of the lateral outriggers, a rear bumper mounted on the rearwardly overhanging ends of the body sills, resilient means restraining pivotal movement of the lever arms relatively to the frame and reacting in an upward direction on the lateral outriggers of the rear cross member of the frame, the reaction being opposed by the weight of the body extension and its contents whereby the bending moments to which the frame is subjected are reduced, and means whereby a blow on the rear bumper is transmitted from the body to the frame and thereby shared between the body and the frame.

2. In a motor vehicle, in combination, a frame, a body, a wheel supporting lever arm pivotally mounted on the frame, means resiliently restraining pivotal movement of the lever arm, said means reacting in an upward direction on the frame, an extension of the body adapted to contain some of the essential load items and extending longitudinally beyond the frame, and having a bumper mounted thereon with means for transmitting any blow on the bumper to the frame as directly as possible, said extension being supported at a point on the frame in that region thereof on which the said resilient means react, whereby the mass of the extension of the body with some of the essential load items is concentrated at the said point on the frame in opposition to the upward force of the resilient means, and the forces and loads to which the vehicle is subjected are divided between the body and the frame, and the stresses to which the latter is subjected are reduced.

3. In a motor vehicle, in combination, a frame, a body, a rear wheel supporting lever arm pivotally mounted on the frame, means resiliently restraining pivotal movement of the lever arm, said means reacting in an upward direction on the frame, a bustle adapted to contain some of the essential load items and constituting an extension of the body to the rear of the frame, and having a rear bumper mounted thereon with means for transmitting any blow on the said bumper to the frame as directly as possible, said bustle being supported at a point on the frame in that region thereof on which the said resilient means react, whereby the mass of the bustle with some of the essential load items is concentrated at the said point on the frame in opposition to the upward force of the resilient means, and the forces and loads to which the vehicle is subjected are divided between the body and the frame, and the stresses to which the latter is subjected are reduced.

4. A motor vehicle according to claim 2 in which the frame is narrower than the body and is provided with lateral outriggers on which the body is supported.

5. A motor vehicle according to claim 2 in which the resilient means restraining pivotal movement of the lever arm consists of a quarter elliptic leaf spring rigidly bolted to the lever arm.

6. A motor vehicle according to claim 2, having pads of non-resonant material interposed between the body and the frame at their points of attachment, and means whereby any blow on the bumper is transmitted from the body to the frame through resilient cushioning means.

7. In a motor vehicle, in combination, a frame, a body, driven road wheels, lever arms pivotally mounted on the vehicle frame for the support of the driven road wheels, drive shafts to the said road wheels, gearing for the drive shafts, a housing for the gearing mounted on the frame, the frame terminating immediately beyond the housing, means resiliently restraining pivotal movement of the lever arms, said means reacting in an upward direction on the frame, an extension of the body adapted to contain some of the essential load items and extending longitudinally beyond the frame, and having a bumper mounted thereon with means for transmitting any blow on the bumper to the frame as directly as possible, said extension being supported at a point on the frame in that region thereof on which the said resilient means react, whereby the mass of the extension of the body with some of the essential load items is concentrated at the said point on the frame in opposition to the upward force of the resilient means, and the forces and loads to which the vehicle is subjected are divided between the body and the frame, and the stresses to which the latter is subjected are reduced.

MAURICE OLLEY.